United States Patent [19]

Bitson

[11] 4,114,452
[45] Sep. 19, 1978

[54] MOVING MAGNET MINIATURE ANGULAR RATE SENSOR

[75] Inventor: Joseph W. Bitson, Chino, Calif.

[73] Assignee: General Dynamics Corporation, Pomona, Calif.

[21] Appl. No.: 823,817

[22] Filed: Aug. 11, 1977

[51] Int. Cl.² .............................................. G01P 9/02
[52] U.S. Cl. ...................................... 73/504; 74/5 R
[58] Field of Search ..................... 73/504, 505, 516 R, 73/517 A; 74/5 R, 5.7

[56] References Cited

U.S. PATENT DOCUMENTS

| | | | |
|---|---|---|---|
| 1,408,110 | 2/1922 | MacGahan | 73/517 R |
| 2,657,353 | 10/1953 | Wiancko | 73/497 X |
| 2,815,584 | 12/1957 | Watson | 73/504 |
| 3,001,407 | 9/1961 | Wianko et al. | 73/497 |
| 3,078,728 | 2/1963 | Schlesman | 74/5 |
| 3,259,890 | 7/1966 | Wood | 73/517 R |
| 3,664,175 | 5/1972 | Pierson | 73/517 R X |

FOREIGN PATENT DOCUMENTS 713,550  8/1954  United Kingdom ................. 73/516 R Primary Examiner—James J. Gill
Attorney, Agent, or Firm—Neil F. Martin; Edward B. Johnson

[57] ABSTRACT

A steering rate sensing device for use in the control of a rotating air frame comprises a base member adapted to be secured to the frame for rotation therewith about its rotary axis, a magnetic member pivotally mounted for pivotal movement about an axis transverse to the rotary axis and a coil encircling the magnetic body for sensing and picking up a signal induced by relative angular movement of the magnetic member with the coil. The device responds to gyroscopic effect induced by rotation thereof upon movement of the air frame from its axial orientation to cause the magnetic member to move relative to the sensing coil for generating a signal.

15 Claims, 5 Drawing Figures

MOVING MAGNET MINIATURE ANGULAR RATE SENSOR

BACKGROUND OF THE INVENTION

The present invention relates to control mechanisms and pertains particularly to a steering rate sensing device for use in rotating air frames.

Many missiles have been designed for intentionally induced and maintained roll rates about their longitudinal axis during flight. Such missiles have significant and practical advantages over roll stabilized air frames. This rolling air frame concept has been applied to both air and surface launched missiles. These missiles can be spun up initially by the launcher and utilize control surfaces to maintain a predetermined rate of roll. With a roll rate of approximately 5 to 10 revolutions per second, it is possible to utilize a single control plane to guide the missile in all three earth related axes.

In a typical application of this concept, as disclosed in U.S. Pat. No. 4,037,806, the control system utilizes a single pair of variable incidence control surfaces to steer the missile about the control plane at a selected instantaneous rotational orientation upon command from a guidance command signal. Thus, with such a missile operating in a level flight attitude, to cause the missile to climb, a guidance command signal must vary in amplitude at a frequency equal to the roll rate of the missile. For example, in the vertical plane, the guidance command signal would be a generally sinusoidal wave form that would induce pitch-up as the control plane of the vehicle approaches earth vertical and pitch-down after the control surface rotates and nearest a one-half revolution from pitch-up, thereby producing upward change in angle of attack. The angle of attack produces a body lift and alters the missile course from a horizontal to a climbing course. Similarly, a course change to the right would be effected by a sinusoidal signal displaced 90° C. from the signal required for a vertical course change. This provides a simplified control system resulting in a reduction in cost and increase in reliability for rolling air frames as opposed to stabilized air frames.

The present invention was conceived and developed for utilization in a recently developed autopilot control system for rolling air frames. This autopilot control system is disclosed in application Ser. No. 637,565, filed Dec. 4, 1975, by Donald R. Cole, entitled "Rolling Air Frame Autopilot", now Pat. No. 4,008,800 and assigned to the assignee hereof. Heretofore no adequate control devices have been available for use in such autopilot systems for rolling air frame systems.

It is therefore desirable that suitable steering rate sensing devices be available which are simple and effective for use in autopilot systems for rolling air frames.

SUMMARY AND OBJECTS OF THE INVENTION

It is therefore the primary object of the present invention to overcome the above problems of the prior art.

Another object of the present invention is to provide a steering rate sensing means for use in rolling air frames.

Another object of the present invention is to provide a simple and effective steering rate sensing device for use in the control system of a rolling air frame.

In accordance with the primary aspect of the present invention, a steering rate sensing device for use in rolling air frames includes a base member having magnetic means for pivotal movement on the base member and a sensing coil surrounding the magnetic member and secured to the base member for relative movement between the magnetic member and the sensing coil upon deviation of the device from its axial orientation during rotation thereof.

BRIEF DESCRIPTION OF THE DRAWINGS

The above and other objects and advantages of the present invention will become apparent when read in conjunction with the drawings, wherein.

DETAILED DESCRIPTION OF A PREFERRED EMBODIMENT

Figure 1:
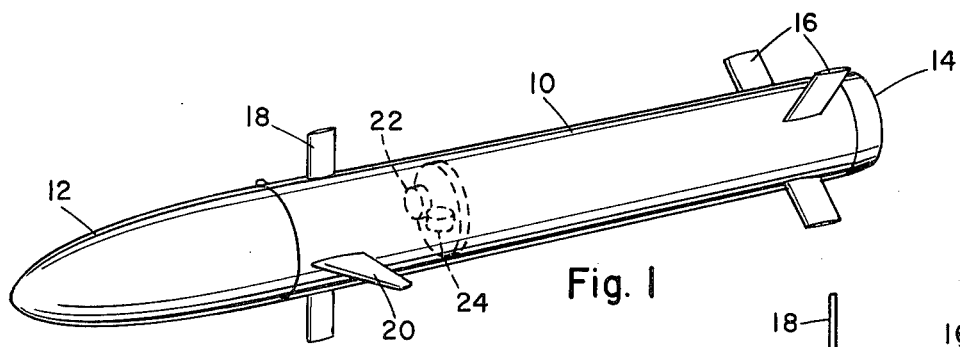
FIG. 1 is a perspective view of a typical missile incorporating the steering rate sensor.

Turning now to FIG. 1 of the drawing, a typical example of a rolling air frame is illustrated in the form of a missile. The air frame comprises a generally elongated cylindrical body 10, having an aerodynamically shaped nose 12 and tail end 14 from which thrust from a rocket engine or the like emerges. The body is provided with a plurality of roll inducing fins or surfaces 16 near the tail end thereof for inducing and/or maintaining a roll in the body about its longitudinal axis. The device is also provided with a pair of fixed canard surfaces 18 and a pair of variable incidence canard surfaces 20. The canard surfaces 20 may be rotated to positive and negative angles of incidence by a suitable control system, such as disclosed in the aforementioned application, Ser. No. 637,565. The canard surfaces 20 control attitude in a plane passing through the longitudinal axis of the missile and perpendicular to the axis of rotation of the control surfaces. This plane is referred to as the control plane. References to up or down on the control plane are vehicle related directions. The control system for the air frame includes a steering rate sensor 22 and an accelerometer 24.

The roll inducing surfaces 16 together with an initial spin-up of the missile provided by the launcher results in a roll rate about the longitudinal axis of approximately 10 revolutions per second. Steering control of the air frame is accomplished by varying the incidence of the control surfaces 20 in a cyclical manner to correspond to the instantaneous position of the control plane. For example, with the vehicle negotiating a horizontal flight path and if it is desired to cause the vehicle to be steered in a curved path to the left, the control surfaces 20 are given a positive angle of attack which is at a maximum when the up section of the control plane is in the left 180° of rotation. Ignoring control reaction delay, the positive incidence angle reaches a maximum as the control plane is at the earth related horizontal (the vehicle related up section of the control plane to the left). During the next 90° of rotation, the positive incidence of the control surface is reduced to 0 and in the succeeding 90° of rotation is moved to a negative angle of attack reaching a maximum when the control plane is again horizontal with the vehicle related up section to the left. The movement of the control surfaces 20 corresponds to a sinusoidal variation with a frequency equal to the roll rate and with the relative phase determined by the direction of the desired correction.

Figure 2:
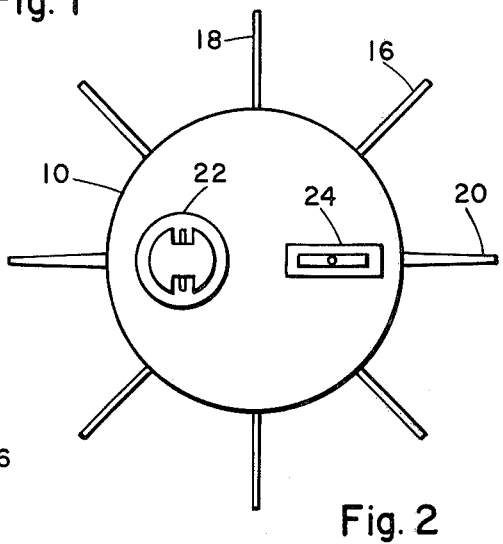
FIG. 2 is a diagrammatic view showing the orientation of the sensor in the missile.

Turning now to FIG. 2 of the drawing, there is illustrated an angular rate or steering rate sensor 22 and an accelerometer 24. The accelerometer 24 is mounted on the air frame with its sensitive axis lying in the control plane, but inverted relative to the air frame vertical so that the accelerometer produces a signal corresponding to acceleration in the control plane but with the opposite sense.

Figure 3:
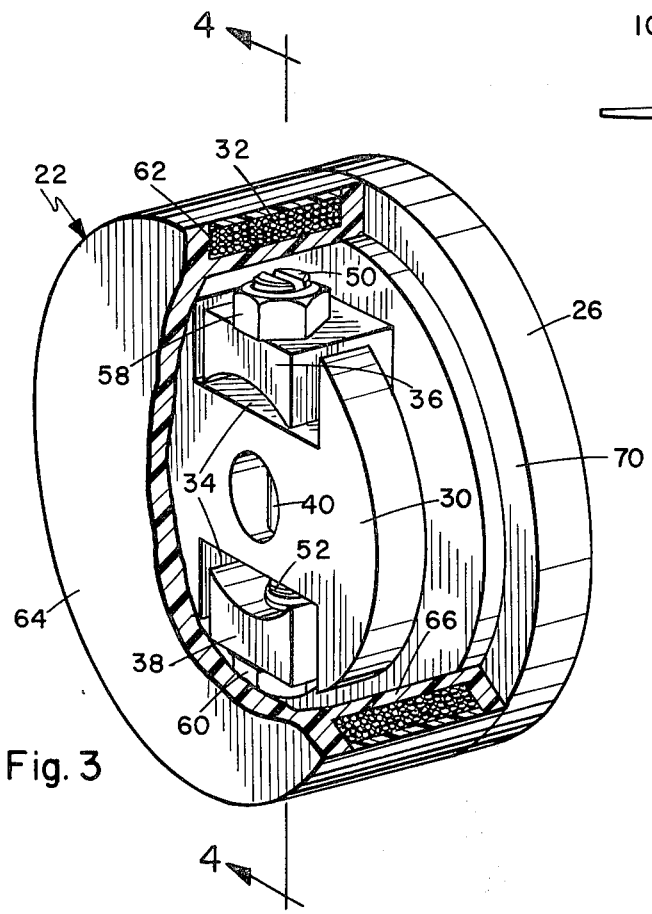
FIG. 3 is a cut away perspective view of the sensor.
Figure 5:
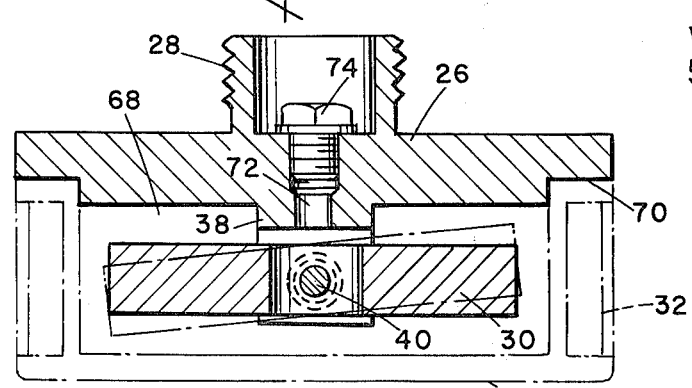
FIG. 5 is a sectional view taken on line 5—5 of FIG. 4, with the cover indicated in broken lines.
Figure 4:
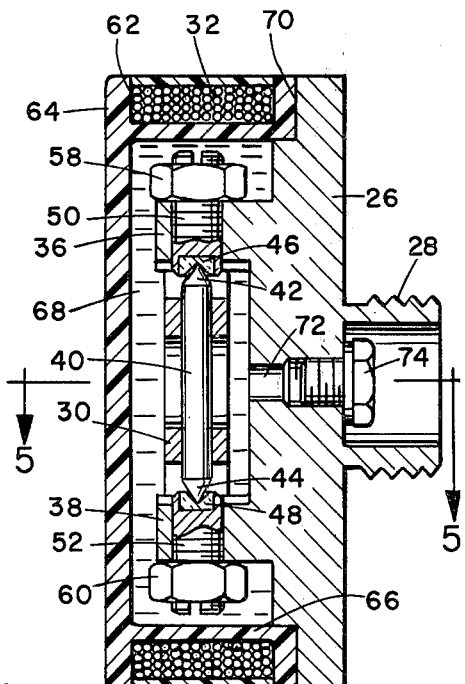
FIG. 4 is a sectional view taken on line 4—4 of FIG. 3.

The angular rate or steering rate sensor 22, as best illustrated in FIGS. 3 through 5, comprises a base member 26 having suitable means, such as a coaxially located mounting stud 28, for attachment to a rotating body, such as a rolling air frame. This stud permits the device to be rotated relative to the air frame for best phase. A magnetic member 30 generally referred to as a flapper, is pivotally mounted to the base 26 about an axis that is transverse to the rotary axis of the base. This magnetic member 30 is then encircled by an inductive pick-off coil 32. This entire assembly constitutes what may be referred to as a rotor.

The magnetic member 30 is in the general configuration of a disc or the like having generally rectangular cut-outs 34 for receiving a pair of trunion mount or lug members 36 and 38 extending upward from the base member 26. A cylindrical shaft or pivot pin 40 extends within the plane of the magnetic member or flapper 30 and defines the pivot axis thereof. The pivot pin 40 includes conical pointed mount ends 42 and 44 engaging jeweled bearings 46 and 48, suitably mounted within bores in the ends of screw mounts 50 and 52 threaded through trunion mounts 36 and 38. A pair of lug nuts 58 and 60 permit adjustment and locking of the bearing support screws 50 and 52 in position. Although jeweled bearings are disclosed and preferred, other bearings or supports may be utilized, such as spring supports and/or ball bearings and the like. The magnetic member or flapper 30 is balanced about the axis of pivot pin 40 defining its pivot axis and also about its rotary axis coinciding with the rotary axis of the base member 26. This axis again preferably coincides with the longitudinal or rotary axis of the rolling air frame.

The inductive pick-off 32 preferably includes or comprises a plurality of coils of suitable conductive wire, such as copper wire, wound about a spool or bobbin formed by a circumferential channel 62 in a housing 64. The housing 64 includes an axially extending cylindrical wall 66 defining the support for the induction coil 32 and also serving to define a generally cylindrical chamber 68 for enclosing the flapper assembly. The end of the wall 66 engages a stepped annular flange 70 on base 26 for sealingly enclosing the flapper assembly.

A suitable damping fluid may be introduced within the chamber 68 by means of a bore 72 and a suitable plug 74. The illustrated apparatus is preferably mounted within a rolling air frame, such as illustrated in FIG. 1, in a position for detecting steering rate in the control plane. The inductive pick-off assembly or coil 32 surrounds the flapper or magnetic member 30. Since the entire apparatus rotates with the air frame, a gyroscopic effect is produced on the flapper 30, which in conjunction with the damping fluid within the chamber 68 stabilizes the position of the magnetic flapper, and therefore a zero output is experienced by the inductive pick off when the air frame is in straight and level flight. However, when action of the control surfaces 20 causes the air frame attitude to change in the control plane, the angular velocity of that steering movement determines the degree to which the magnetic flapper 30 will precess. The precession of the magnetic flapper 30 results in the induction of an EMF within the induction coil 32. The flapper oscillates about its pivot axis at the roll rate of the air frame. The amplitude of this oscillation is dependent upon the steering rate, the roll rate, the viscous damping, friction, magnetic coupling, air gap and the inertia. The AC signal induced into the coil 32 is dependent upon the number of coil turns, the gauss level, and the rate of the rotor motion. If the direction of the steering rate is changed, the phase of the induced signal changes.

The electrical signal generated by this movement of the flapper may be utilized as a signal for controlling the autopilot of the air frame. The signal, if necessary, may be amplified to boost the signal amplitude. The system, or apparatus, has only a single moving part, and the only electrical power required is that to operate a small IC operational amplifier needed to boost the signal amplitude. No spin motors or demodulator electronics are required.

The equations of motion of the system are not believed to be essential to a complete understanding of the invention. These can be readily developed by those of skill in the art when considering the dynamics of the illustrated apparatus.

Friction will have an effect on the damping of the system and therefore must be accounted for in the system. The apparatus can be designed for specific revolutions per second in the roll rate of the air frame. Good bearing design and rotor balance about its rotary axis and about its pivot axis are essential to optimum performance. Balance about the rotary axis will avoid unequal loading of the bearings and balance about the pivot axis will preclude forcing one of the magnetic poles of the flapper against the case of the device during the acceleration phase of the flight. The apparatus is designed to have a natural frequency that is equal to that of the roll rate. Viscous damping of the flapper is provided by means of a damping fluid, such as kerosene or a silicon oil, within the casing. Damping can be varied by a number of techniques, including changing the internal geometry, by reducing the gap between the ends of the flapper and the inside diameter of the housing, or loading the coil.

The fact that the flapper is magnetized and is moving will induce electrical current flow in nearby conductors. This is known as Lenz's Law which further states that the motion of the rotor will be opposed. The opposing force is proportional to the current induced and the magnetic field generated in the conductor. This means that certain damping can or will be imposed on the flapper by means of any metal within the vicinity of the flapper. The performance of the device will also be affected by nearby magnetic materials. Thus, this must be taken into consideration.

The signal amplitude or output of the apparatus can be altered by a number of techniques, including the distance of the coil from the rotor or flapper. Also increasing the number of turns in the coil will also increase the amplitude. Since a very small current will be induced in the coil, the wire size may be quite small. The longitudinal length of the coil is subject to the peak-to-peak angular position of the rotor. The length of the coil and the permissible swing of the flapper are preferably controlled to maintain a more direct proportionality between the oscillations of the flapper and the induced signal.

Certain design parameters can enhance the function or performance of the apparatus. For example, a small volume with a low viscosity fluid and no magnetic material present appears to provide the best results. Using a coil with many turns allows a lower gauss level with about the same signal amplitude. The lower gauss level will decrease the tendency of the rotor to magnetically latch.

The signal from the steering rate sensing apparatus can be used in an autopilot control system to greatly enhance the performance and maneuverability of a missile or other rolling air frames.

While the present invention has been illustrated and described by means of a particular embodiment, it is to be understood that numerous changes and modifications may be made therein without departing from the spirit and scope of the invention as defined in the appended claims.

Having described my invention, I now claim:

1. A steering rate sensing device for a rotating body comprising:
    a base member adapted to be mounted on and rotated with a rotating body about a rotary axis,
    magnetic means pivotally mounted about a pivot axis on pivot means fixed to said base member for rotation therewith about said rotary axis, and
    a sensing coil mounted on said base member for rotation therewith,
    said magnetic means and said sensing coil being mounted for relative angular movement therebetween about said pivot axis transverse to the rotary axis of said base member and operative to generate a signal in response thereto.

2. The steering rate sensor of claim 1, wherein said sensing coil is fixed to said base member co-axial to the axis thereof and encircles said magnetic means.

3. The steering rate sensor of claim 1, wherein said magnetic means is balanced about said pivot axis.

4. The steering rate sensor of claim 1, wherein rotation of said rotary body induces a gyroscopic effect on said magnetic means so that movement of the axis of said rotating body includes a precession in said magnetic means for causing movement thereof relative to said coil thereby generating a signal therein.

5. The steering rate sensor of claim 4, wherein said signal is proportional to the rate of change in direction of said rotary body from its axial direction.

6. The steering rate sensing device of claim 1, wherein:
    said base member is mounted on an elongated air frame having a predetermined rate of rotation about its longitudinal axis, thereby defining said rotary axis, said base member having its rotary axis coinciding with the rotary axis of said air frame,
    said relative angular movement between said magnetic means and said sensing coil is about a pivot axis that intersects said rotary axes at right angles thereto.

7. The steering rate sensor of claim 6, wherein:
    said sensing coil is fixed to said base member, and encircles said magnetic means, and
    said magnetic means is a permanent magnet mounted for pivotal movement about said pivot axis by means of spaced apart trunion bearings.

8. The steering rate sensor of claim 7, including damping means for said magnetic means.

9. The steering rate sensor of claim 8, wherein:
    said damping means is a fluid surrounding said magnetic means.

10. The steering rate sensor of claim 8, wherein:
    said damping means comprises conductive material in close proximity to said magnetic means.

11. The steering rate sensor of claim 7, wherein:
    said magnet is balanced about said pivot axis and the rotary axis of said base.

12. The steering rate sensor of claim 11, wherein:
    rotation of said air frame induces a gyroscopic effect on said magnet, and
    a change in the orientation of the rotary axis of said air frame induces said magnet to oscillate about said pivot axis at the rate of rotation thereof, thereby generating an electrical current in said sensing coil.

13. The steering rate sensor of claim 12, wherein the amplitude of said oscillation is proportional to the rate of change in axial direction of said air frame.

14. The steering rate sensor of claim 12, wherein: said magnet is enclosed by a housing, said housing defining spool means on which said sensing coil is wound, 15. The steering rate sensor of claim 7, wherein:
    said sensing coil is circumferentially wound about the rotary axis of said base for encircling said magnet.

* * * * *

UNITED STATES PATENT AND TRADEMARK OFFICE
CERTIFICATE OF CORRECTION

PATENT NO. : 4,114,452
DATED : September 19, 1978
INVENTOR(S) : Joseph W. Bitson It is certified that error appears in the above-identified patent and that said Letters Patent are hereby corrected as shown below:

In the specification, Column 1, line 49, delete "4,008,800" and substitute --4,054,254--.

Signed and Sealed this

Twenty-sixth Day of December 1978

[SEAL]

Attest:

RUTH C. MASON
Attesting Officer

DONALD W. BANNER
Commissioner of Patents and Trademarks